United States Patent
Li et al.

(10) Patent No.: US 11,042,915 B2
(45) Date of Patent: Jun. 22, 2021

(54) ORDER PROCESSING METHOD AND TERMINAL

(71) Applicant: Huawei Technologies Co., Ltd., Shenzhen (CN)

(72) Inventors: Guoqing Li, Shenzhen (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/529,396

(22) Filed: Aug. 1, 2019

(65) Prior Publication Data
US 2019/0355032 A1     Nov. 21, 2019

Related U.S. Application Data

(63) Continuation of application No. 15/514,338, filed as application No. PCT/CN2014/087464 on Sep. 25, 2014, now Pat. No. 10,410,264.

(51) Int. Cl.
G06Q 30/06     (2012.01)
G06Q 30/02     (2012.01)
G06Q 20/32     (2012.01)

(52) U.S. Cl.
CPC ..... *G06Q 30/0605* (2013.01); *G06Q 30/0633* (2013.01); *G06Q 30/0635* (2013.01);
(Continued)

(58) Field of Classification Search
CPC ................ G06Q 30/0633; G06Q 30/0635
See application file for complete search history.

(56) References Cited

U.S. PATENT DOCUMENTS

2006/0053061 A1   3/2006 Evans
2009/0248540 A1  10/2009 Anderson et al.
(Continued)

FOREIGN PATENT DOCUMENTS

CN    1591499 A     3/2005
CN  102567881 A     7/2012
(Continued)

OTHER PUBLICATIONS

U.S. Appl. No. 15/514,338, filed Mar. 24, 2017.

*Primary Examiner* — A. Hunter Wilder
(74) *Attorney, Agent, or Firm* — Leydig, Voit & Mayer, Ltd.

(57) ABSTRACT

An order processing method comprising: obtaining first order information and order sharing condition information, and generating an order sharing invitation message according to the first order information and the order sharing condition information; receiving an answer message returned by a target terminal according to the order sharing invitation message, and obtaining, according to the answer message, second order information and an acknowledged data transfer state indicated by the second order information; performing combination processing on the first order information and the second order information according to the acknowledged data transfer state returned by the target terminal, and generating settlement order information; and performing settlement on the settlement order information according to the order sharing condition information when the settlement order information meets an order sharing condition indicated by the order sharing condition information.

20 Claims, 6 Drawing Sheets

(52) U.S. Cl.
CPC ..... *G06Q 20/3224* (2013.01); *G06Q 30/0205* (2013.01); *G06Q 30/0261* (2013.01)

(56) References Cited

U.S. PATENT DOCUMENTS

| | | |
|---|---|---|
| 2011/0238472 A1 | 9/2011 | Sunkada |
| 2012/0179516 A1* | 7/2012 | Fakhrai .............. G06Q 30/0207 705/14.1 |
| 2013/0006738 A1 | 1/2013 | Horvitz et al. |
| 2013/0166360 A1 | 6/2013 | Kshetramade et al. |
| 2014/0279098 A1* | 9/2014 | Ham .................... G06Q 20/102 705/16 |
| 2015/0025991 A1 | 1/2015 | Shaw |

FOREIGN PATENT DOCUMENTS

| | | |
|---|---|---|
| CN | 102724628 A | 10/2012 |
| CN | 102880968 A | 1/2013 |
| CN | 103377437 A | 10/2013 |
| CN | 103635923 A | 3/2014 |
| CN | 103745367 A | 4/2014 |
| CN | 103839144 A | 6/2014 |
| CN | 103870987 A | 6/2014 |
| JP | 2006107114 A | 4/2006 |

\* cited by examiner

ORDER PROCESSING METHOD AND TERMINAL

CROSS-REFERENCE TO RELATED APPLICATION

This application is a continuation of U.S. patent application Ser. No. 15/514,338, filed on Mar. 24, 2017, which is a national stage of International Application No. PCT/CN2014/087464, filed on Sep. 25, 2014. All of the aforementioned applications are hereby incorporated by reference in their entireties.

TECHNICAL FIELD

The present disclosure relates to the field of communications technologies, and in particular, to an order processing method and a terminal.

BACKGROUND

For promotion, an e-commerce website always proactively offers coupons to some users in an oriented manner or to all users in a public manner. A coupon is an electronic certificate, which may be a series of digits, a series of letters, or a picture. When paying a data transfer volume of a to-be-purchased item, a user may deduct a specific amount of cash or enjoy a specific percentage of discounts by giving a coupon to an online retailer. Moreover, in daily life, for promotion, a supermarket or a shopping center may also offer preference of enjoying a specific percentage of discounts when a specific amount is consumed.

Each coupon or discount rate set by a merchant of an e-commerce website or of a mall has a specific usage condition, that is, consumption needs to reach a specific amount, and this amount is generally relatively high.

According to the prior art, when a user wants to enjoy the foregoing discount preference, but a total price of items that the user wants to purchase cannot meet a coupon usage condition, the user can only ask, by means of a telephone call, an SMS message, or the like, whether a friend of the user has a shopping demand. If the friend of the user has the shopping demand, the user is notified, and the user places an order for both of them and pays an entire data transfer volume in advance, and then distributes items and reclaims a payable amount of the friend. This process is cumbersome and time-consuming, and has no reliable mechanism to ensure reclamation of the payable amount in time.

SUMMARY

Embodiments of the present disclosure provide an order processing method and a terminal, where combination processing and a settlement operation may be automatically performed on two or more orders, so that a success rate and convenience of sharing orders by users are improved.

To resolve the foregoing technical problem, a first aspect of the present disclosure provides an order processing method, which may include:

obtaining first order information and order sharing condition information, and generating an order sharing invitation message according to the first order information and the order sharing condition information;

receiving an answer message returned by a target terminal according to the order sharing invitation message, and obtaining, according to the answer message, second order information and an acknowledged data transfer state indicated by the second order information;

performing combination processing on the first order information and the second order information according to the acknowledged data transfer state returned by the target terminal, and generating settlement order information; and performing settlement on the settlement order information according to the order sharing condition information when the settlement order information meets an order sharing condition indicated by the order sharing condition information.

Based on the first aspect, in a first feasible implementation manner of the first aspect, after the obtaining first order information and order sharing condition information, and generating an order sharing invitation message according to the first order information and the order sharing condition information, the method further includes:

obtaining a terminal list, where the terminal list includes at least one contact identifier, and a terminal corresponding to each contact identifier is configured to receive the order sharing invitation message.

Based on the first feasible implementation manner of the first aspect, in a second feasible implementation manner of the first aspect, the obtaining a terminal list includes:

obtaining characteristic information corresponding to each contact identifier in a stored contact list and a category of a subject matter indicated by the order sharing condition information; and searching for a contact identifier to which characteristic information associated with the category of the subject matter belongs, and generating the terminal list according to the found contact identifier, where the characteristic information includes a search key field of the subject matter.

Based on the first feasible implementation manner of the first aspect, in a third feasible implementation manner of the first aspect, the obtaining a terminal list includes:

obtaining a contact identifier selected from a stored contact list, and generating the terminal list according to the selected contact identifier.

Based on the second feasible implementation manner of the first aspect or the third feasible implementation manner of the first aspect, in a fourth feasible implementation manner of the first aspect, the stored contact list specifically includes: a contact list stored on a social networking service (SNS) platform.

Based on the first feasible implementation manner of the first aspect, in a fifth feasible implementation manner of the first aspect, the obtaining a terminal list includes:

obtaining a contact identifier within a preset geographical range, and generating the terminal list according to the contact identifier.

Based on the first feasible implementation manner of the first aspect, in a sixth feasible implementation manner of the first aspect, before the receiving an answer message returned by a target terminal according to the order sharing invitation message, the method further includes:

determining whether a time waiting for receiving the answer message of the target terminal exceeds a preset time threshold; and if the time waiting for receiving the answer message of the target terminal exceeds the preset time threshold, resending the order sharing invitation message to the terminal corresponding to each contact identifier, where the resent order sharing invitation message is a message obtained after the order sharing invitation message is updated in real time according to the acknowledged data transfer state.

Based on the first aspect, in a seventh feasible implementation manner of the first aspect, the receiving an answer message returned by a target terminal according to the order sharing invitation message, and obtaining, according to the answer message, second order information and an acknowledged data transfer state indicated by the second order information includes:

receiving the answer message returned by the target terminal according to the order sharing invitation message, and generating, according to the answer message, the second order information including data transfer pre-authorization information; and sending the second order information to the target terminal, so that the target terminal sets the acknowledged data transfer state for the second order information according to the data transfer pre-authorization information.

Based on the first feasible implementation manner of the first aspect, in an eighth feasible implementation manner of the first aspect, before the performing settlement on the settlement order information according to the order sharing condition information, the method further includes:

sending an order sharing success message to the terminal corresponding to each contact identifier.

Based on the first aspect, in a ninth feasible implementation manner of the first aspect, the first order information includes a first data transfer volume, the order sharing condition information includes a minimum data transfer volume required to meet the order sharing condition, and the second order information includes a second data transfer volume; and the performing settlement on the settlement order information according to the order sharing condition information when the settlement order information meets an order sharing condition indicated by the order sharing condition information includes:

performing the settlement on the settlement order information according to the order sharing condition information when a sum of the first data transfer volume and the second data transfer volume is greater than or equal to the minimum data transfer volume.

Based on the ninth feasible implementation manner of the first aspect, in a tenth feasible implementation manner of the first aspect, the method further includes:

sending settlement status information in the settlement order information to the target terminal.

A second aspect of the present disclosure provides a terminal, which may include:

an order sharing invitation module, configured to obtain first order information and order sharing condition information, and generate an order sharing invitation message according to the first order information and the order sharing condition information;

a status management module, configured to receive an answer message returned by a target terminal according to the order sharing invitation message, and obtain, according to the answer message, second order information and an acknowledged data transfer state indicated by the second order information;

an order combination module, configured to perform combination processing on the first order information and the second order information according to the acknowledged data transfer state returned by the target terminal, and generate settlement order information; and a settlement module, configured to perform settlement on the settlement order information according to the order sharing condition information when the settlement order information meets an order sharing condition indicated by the order sharing condition information.

Based on the second aspect, in a first feasible implementation manner of the second aspect, the terminal further includes:

a terminal list obtaining module, configured to obtain a terminal list, where the terminal list includes at least one contact identifier, and a terminal corresponding to each contact identifier is configured to receive the order sharing invitation message.

Based on the first feasible implementation manner of the second aspect, in a second feasible implementation manner of the second aspect, the terminal list obtaining module includes:

a first obtaining unit, configured to obtain characteristic information corresponding to each contact identifier in a stored contact list and a category of a subject matter indicated by the order sharing condition information; and a searching unit, configured to search for a contact identifier to which characteristic information associated with the category of the subject matter belongs, and generate the terminal list according to the found contact identifier, where the characteristic information includes a search key field of the subject matter.

Based on the first feasible implementation manner of the second aspect, in a third feasible implementation manner of the second aspect, the terminal list obtaining module includes:

a second obtaining unit, configured to obtain a contact identifier selected from a stored contact list, and generate the terminal list according to the selected contact identifier.

Based on the second feasible implementation manner of the second aspect or the third feasible implementation manner of the second aspect, in a fourth feasible implementation manner of the second aspect, the stored contact list specifically includes: a contact list stored on an SNS platform.

Based on the first feasible implementation manner of the second aspect, in a fifth feasible implementation manner of the second aspect, the terminal list obtaining module includes:

a third obtaining unit, configured to obtain a contact identifier within a preset geographical range, and generate the terminal list according to the contact identifier.

Based on the first feasible implementation manner of the second aspect, in a sixth feasible implementation manner of the second aspect, the terminal further includes:

a determining module, configured to determine whether a time waiting for receiving the answer message of the target terminal exceeds a preset time threshold; and a first sending module, configured to: when the determining module determines that the time waiting for receiving the second order information of the target terminal exceeds the preset time threshold, resend the order sharing invitation message to the terminal corresponding to each contact identifier, where the resent order sharing invitation message is a message obtained after the order sharing invitation message is updated in real time according to the acknowledged data transfer state.

Based on the second aspect, in a seventh feasible implementation manner of the second aspect, the status management module includes:

a receiving unit, configured to receive the answer message returned by the target terminal according to the order sharing invitation message, and generate, according to the answer message, the second order information including data transfer pre-authorization information; and an information sending unit, configured to send the second order information to the target terminal, so that the target terminal sets the acknowledged data transfer state for the second order information according to the data transfer pre-authorization information.

Based on the first feasible implementation manner of the second aspect, in an eighth feasible implementation manner of the second aspect, the terminal further includes:

a second sending module, configured to: before the settlement module performs the settlement on the settlement order information according to the order sharing condition information, send an order sharing success message to the terminal corresponding to each contact identifier.

Based on the second aspect, in a ninth feasible implementation manner of the second aspect, the first order information includes a first data transfer volume, the order sharing condition information includes a minimum data transfer volume required to meet the order sharing condition, and the second order information includes a second data transfer volume; and the settlement module is specifically configured to perform the settlement on the settlement order information according to the order sharing condition information when a sum of the first data transfer volume and the second data transfer volume is greater than or equal to the minimum data transfer volume.

Based on the ninth feasible implementation manner of the second aspect, in a tenth feasible implementation manner of the second aspect, the terminal further includes:

a third sending module, configured to send settlement status information in the settlement order information to the target terminal.

A third aspect of the present disclosure provides a computer storage medium, where the computer storage medium stores a program, and the program executes the steps described in the foregoing first aspect.

A fourth aspect of the present disclosure provides a terminal, including: a processor, a memory, an input device, and an output device, where the processor is configured to:

obtain first order information and order sharing condition information, and generate an order sharing invitation message according to the first order information and the order sharing condition information;

control the input device to receive an answer message returned by a target terminal according to the order sharing invitation message, and obtain, according to the answer message, second order information and an acknowledged data transfer state indicated by the second order information;

perform combination processing on the first order information and the second order information according to the acknowledged data transfer state returned by the target terminal, and generate settlement order information; and when the settlement order information meets an order sharing condition indicated by the order sharing condition information, control the output device to perform settlement on the settlement order information according to the order sharing condition information.

Based on the fourth aspect, in a first feasible implementation manner of the fourth aspect, after being configured to obtain the first order information and the order sharing condition information, and generate the order sharing invitation message according to the first order information and the order sharing condition information, the processor is further configured to:

obtain a terminal list, where the terminal list includes at least one contact identifier, and a terminal corresponding to each contact identifier is configured to receive the order sharing invitation message.

Based on the first feasible implementation manner of the fourth aspect, in a second feasible implementation manner of the fourth aspect, when being configured to obtain the terminal list, the processor is specifically configured to:

obtain characteristic information corresponding to each contact identifier in a stored contact list and a category of a subject matter indicated by the order sharing condition information; and search for a contact identifier to which characteristic information associated with the category of the subject matter belongs, and generate the terminal list according to the found contact identifier, where the characteristic information includes a search key field of the subject matter.

Based on the first feasible implementation manner of the fourth aspect, in a third feasible implementation manner of the fourth aspect, when being configured to obtain the terminal list, the processor is specifically configured to:

obtain a contact identifier selected from a stored contact list, and generate the terminal list according to the selected contact identifier.

Based on the second feasible implementation manner of the fourth aspect or the third feasible implementation manner of the fourth aspect, in a fourth feasible implementation manner of the fourth aspect, the stored contact list specifically includes: a contact list stored on an SNS platform.

Based on the first feasible implementation manner of the fourth aspect, in a fifth feasible implementation manner of the fourth aspect, when being configured to obtain the terminal list, the processor is specifically configured to:

control the input device to obtain a contact identifier within a preset geographical range, and generate the terminal list according to the contact identifier.

Based on the first feasible implementation manner of the fourth aspect, in a sixth feasible implementation manner of the fourth aspect, before being configured to receive the answer message returned by the target terminal according to the order sharing invitation message, the processor is further configured to:

determine whether a time during which the input device waits to receive the answer message of the target terminal exceeds a preset time threshold; and if yes, control the output device to resend the order sharing invitation message to the terminal corresponding to each contact identifier, where the resent order sharing invitation message is a message obtained after the order sharing invitation message is updated in real time according to the acknowledged data transfer state.

Based on the fourth aspect, in a seventh feasible implementation manner of the fourth aspect, when being configured to receive the answer message returned by the target terminal according to the order sharing invitation message, and obtain, according to the answer message, the second order information and the acknowledged data transfer state indicated by the second order information, the processor is specifically configured to:

control the input device to receive the answer message returned by the target terminal according to the order sharing invitation message, and generate, according to the answer message, the second order information including data transfer pre-authorization information; and control the output device to send the second order information to the target terminal, so that the target terminal sets the acknowledged data transfer state for the second order information according to the data transfer pre-authorization information.

Based on the first feasible implementation manner of the fourth aspect, in an eighth feasible implementation manner of the fourth aspect, before being configured to perform the settlement on the settlement order information according to the order sharing condition information, the processor is further configured to:

control the output device to send an order sharing success message to the terminal corresponding to each contact identifier.

Based on the fourth aspect, in a ninth feasible implementation manner of the fourth aspect, the first order information includes a first data transfer volume, the order sharing condition information includes a minimum data transfer volume required to meet the order sharing condition, and the second order information includes a second data transfer volume; and the processor is configured to perform the settlement on the settlement order information according to the order sharing condition information when the settlement order information meets an order sharing condition indicated by the order sharing condition information, where the processor is specifically configured to:

perform the settlement on the settlement order information according to the order sharing condition information when a sum of the first data transfer volume and the second data transfer volume is greater than or equal to the minimum data transfer volume.

Based on the ninth feasible implementation manner of the fourth aspect, in a tenth feasible implementation manner of the fourth aspect, the processor is further configured to:

control the output device to send settlement status information in the settlement order information to the target terminal.

In the embodiments of the present disclosure, after an order sharing invitation message generated by using first order information and order sharing condition information is sent to one or more terminals, an answer message returned by a target terminal is received. After combination processing (that is, an order sharing operation) is performed on the first order information and second order information generated according to the answer message, settlement is performed on a blanket order according to an order sharing condition (which may be a preference condition) indicated by the order sharing condition information. A user who obtains the order sharing condition information does not need to manually contact another user who may join order sharing. A terminal may automatically process a combination of two or more orders, and perform settlement after the order combination succeeds, so that a usage rate of the order sharing condition and a success rate are increased, a sales volume of a merchant who releases the order sharing condition is increased, and payable amount reclamation is ensured with reference to an acknowledged data transfer state.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a terminal may include mobile terminal devices such as a tablet computer, a smartphone, a notebook computer, a palmtop computer, and a mobile Internet device (MID).

An order processing method provided in the embodiments of the present disclosure may be applied to a scenario of shopping consumption on an e-commerce website or in a daily shopping mall. An involved order sharing condition specifically refers to a condition that an order needs to meet to enjoy some preference, and may specifically include a preferential activity launched by the e-commerce website or the mall for promotion, for example, offering a full coupon (discount preference or amount deduction preference enjoyed after an order reaches a specific amount).

Figure 1:
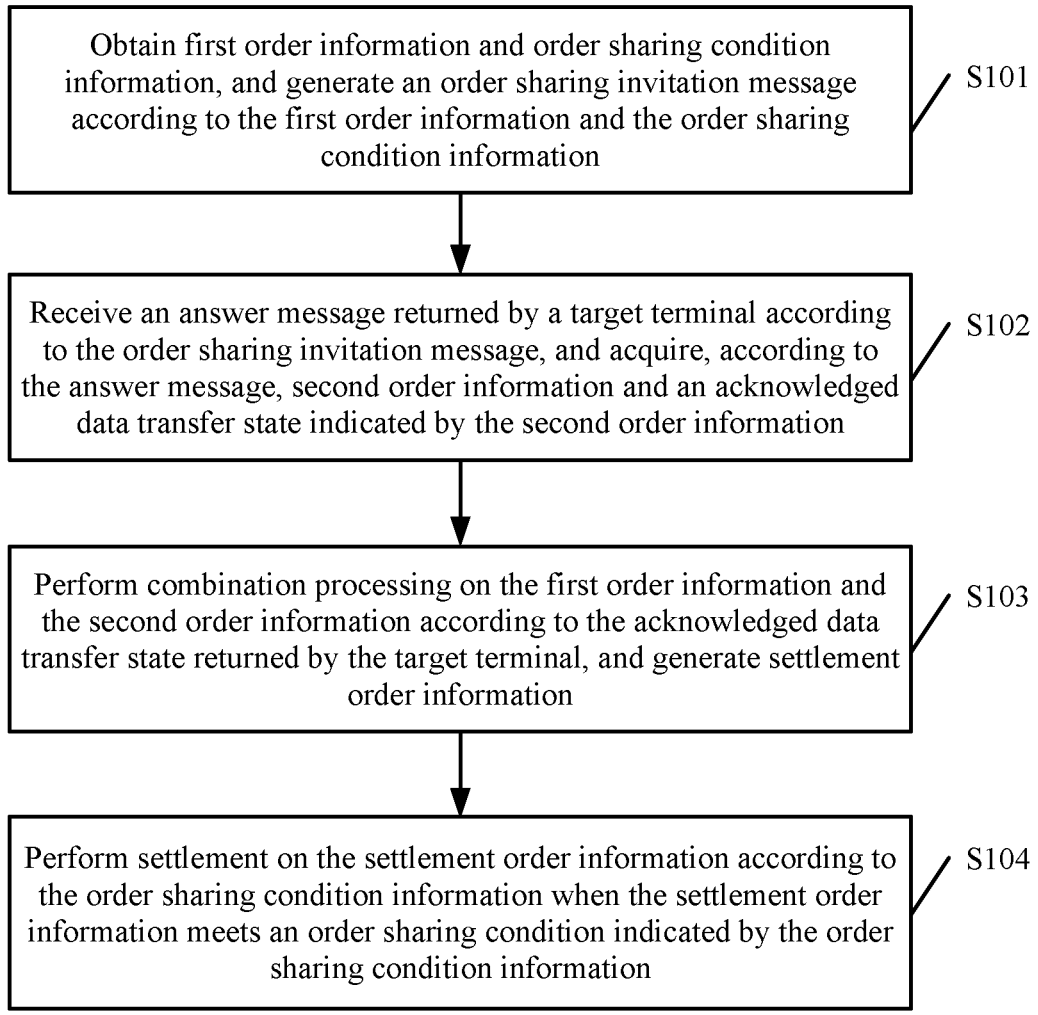
FIG. 1 is a schematic flowchart of an order processing method according to an embodiment of the present disclosure.
Figure 2A:
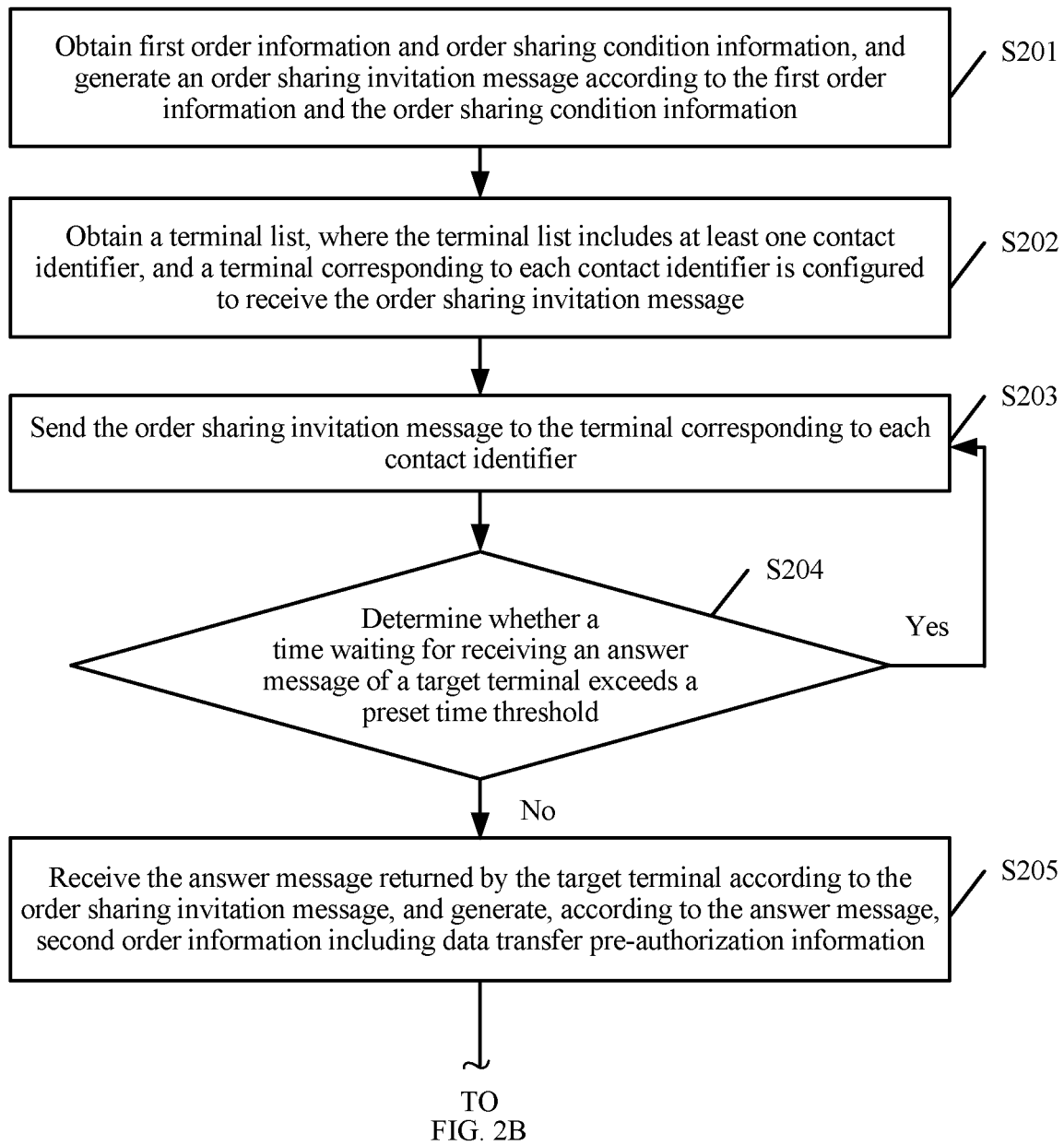
FIG. 2A and FIG. 2B are a schematic flowchart of another order processing method according to an embodiment of the present disclosure.
Figure 2B:
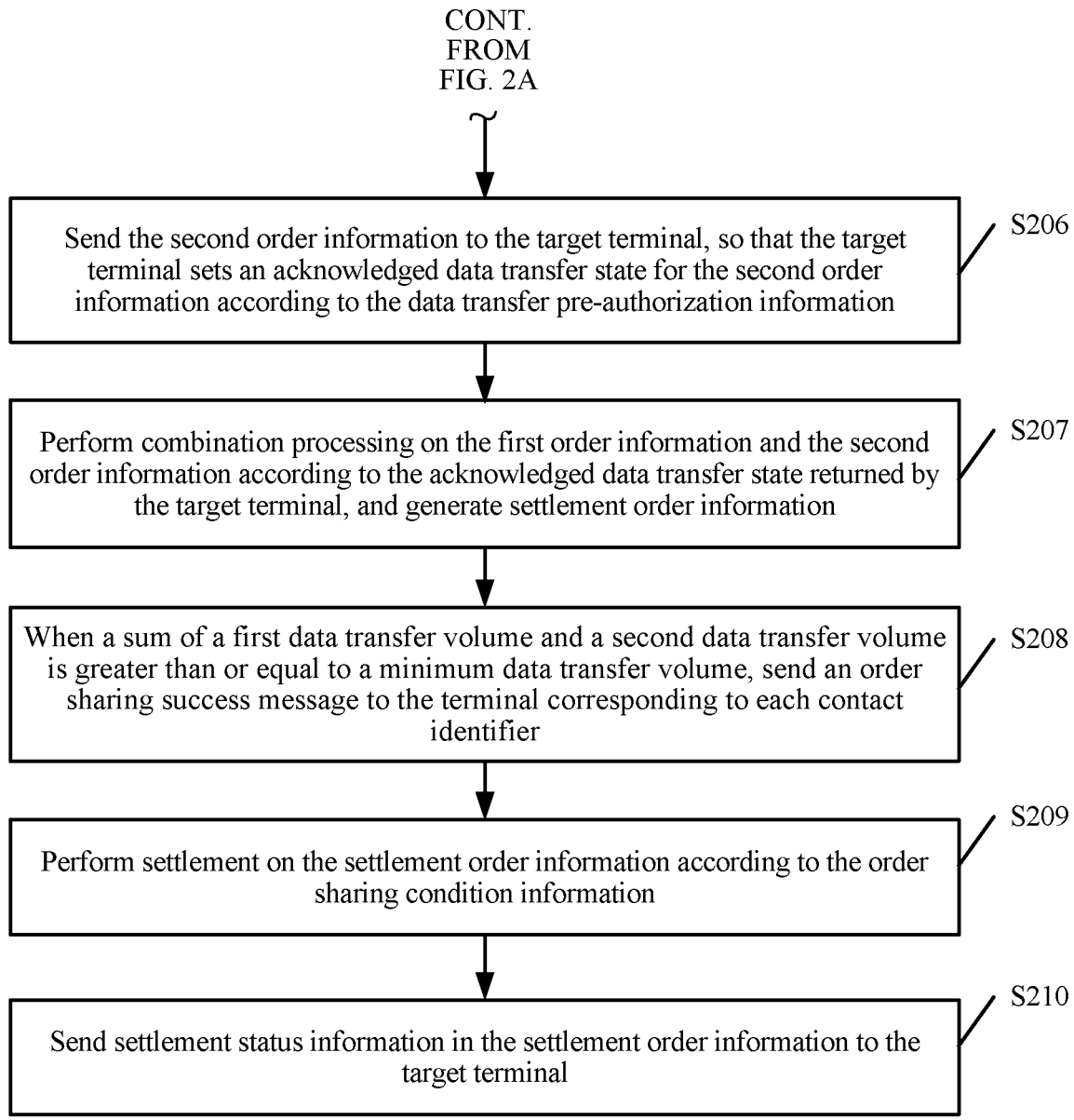

With reference to FIG. 1, FIG. 2A, and FIG. 2B, the following describes in detail order processing methods provided in embodiments of the present disclosure.

Referring to FIG. 1, FIG. 1 is a schematic flowchart of an order processing method according to an embodiment of the present disclosure. As shown in FIG. 1, the method in this embodiment of the present disclosure may include the following step S101 to step S104.

S101. Obtain first order information and order sharing condition information, and generate an order sharing invitation message according to the first order information and the order sharing condition information.

Specifically, when a user (an order sharing initiator) completes selection of a required item on an e-commerce website or in a mall, an order sharing initiation terminal 1 generates the first order information according to information about the item selected by the user. The first order information includes information such as a type and a price that are of the selected item. An order sharing condition is a preference condition provided by a merchant of the e-commerce website or of the mall. In a specific implementation process, the order sharing condition information is directly sent to the terminal 1 by the e-commerce website, or is preference information that is provided by the mall, entered by the user, and received by the terminal 1. The order sharing invitation message generated by the terminal 1 with reference to the first order information and the order sharing condition information may specifically include: the order sharing condition information (the preference information), information about a remaining amount for meeting the order sharing condition, a category of a subject matter, and a home merchant.

S102. Receive an answer message returned by a target terminal according to the order sharing invitation message, and obtain, according to the answer message, second order information and an acknowledged data transfer state indicated by the second order information.

It should be noted that the target terminal refers to at least one terminal that returns the answer message after receiving the order sharing invitation message and accepting an order sharing invitation. At least one piece of second order information generated by the terminal 1 according to the answer message is combined with the first order information of the terminal 1 (that is, "order sharing").

Specifically, in an implementation manner, the terminal 1 extracts, according to the answer message, an item name included in the answer message, and invokes an e-commerce price query interface to obtain an item price, or uses a web crawler tool to search for a price of a specified item on a specified e-commerce web site, and generates, according to an item price of the e-commerce website that provides the order sharing condition information, the second order information associated with the target terminal. Optionally, when receiving the answer message returned by the target terminal, the terminal 1 may generate, according to the answer message, the second order information including data transfer pre-authorization information. The terminal 1 may save the second order information, and send the second order information to the target terminal. The target terminal may set the acknowledged data transfer state (for example, a selected payment manner and whether payment is completed) for the second order information according to the data transfer pre-authorization information. An optional payment manner includes: QR code payment, sound wave payment, a face-to-face payment manner such as near field communication (NFC) payment or cash payment, and online payment. The terminal 1 may obtain the acknowledged data transfer state, and update a pre-stored payment status in the second order information.

Certainly, before returning the answer message, the target terminal may voluntarily invoke the e-commerce price query interface to obtain the item price, or use the web crawler tool to search for the price of the specified item in the specified e-commerce website, and generate, according to the item price of the e-commerce website that provides the order sharing condition information, the second order information associated with the target terminal. In addition, the target terminal adds the acknowledged data transfer state to the second order information, and sends the acknowledged data transfer state together with the answer message to the terminal 1. The terminal 1 may save the second order information.

It may be understood that the acknowledged data transfer state is specifically presented as a state sent by the target terminal to the terminal 1 when a user to whom the target terminal belongs confirms that an amount of an item that needs to be purchased is successfully transferred to a public account, where the public account may be a third party account. Optionally, the acknowledged data transfer state may further include a face-to-face payment status, an online payment status, or the like, which is specifically determined by a payment manner selected by the user to whom the target terminal belongs.

S103. Perform combination processing on the first order information and the second order information according to the acknowledged data transfer state returned by the target terminal, and generate settlement order information.

Specifically, the settlement order information includes: a name and an original price (a first data transfer volume) that are of an item purchased by the terminal 1, a name and an original price (a second data transfer volume) that are of an item purchased by the target terminal, a payment manner, and the like. The terminal 1 may perform the combination processing on the first order information and the second order information according to the acknowledged data transfer state returned by the target terminal, and generate the settlement order information.

S104. Perform settlement on the settlement order information according to the order sharing condition information when the settlement order information meets an order sharing condition indicated by the order sharing condition information.

Specifically, the first order information includes the first data transfer volume, the order sharing condition information includes a minimum data transfer volume required to meet the order sharing condition, and the second order information includes the second data transfer volume. When a sum of the first data transfer volume and the second data transfer volume that are included in the settlement order information (for example, a sum of original prices of items respectively purchased by the terminal 1 and the target terminal) reaches the minimum data transfer volume indicated by the order sharing condition information (for example, an order preference condition), the settlement is performed on the settlement order information according to the preference information (a discount rate or reduction and exemption preference) included in the order sharing condition information, where a settlement process may include but is not limited to a process in which the terminal 1 places an order on the e-commerce website or in the mall and pays according to the settlement order information.

In this embodiment of the present disclosure, after an order sharing invitation message generated by using first order information and order sharing condition information is sent to one or more terminals, an answer message returned by a target terminal is received. After combination processing (that is, an order sharing operation) is performed on the first order information and second order information generated according to the answer message, settlement is performed on a blanket order according to an order sharing condition (which may be a preference condition) indicated by the order sharing condition information. A user who obtains the order sharing condition information does not need to manually contact another user who may join order sharing. A terminal may automatically process a combination of two or more orders, and perform settlement after the order combination succeeds, so that a usage rate of the order sharing condition and a success rate are increased, a sales volume of a merchant who releases the order sharing condition is increased, and payable amount reclamation is ensured with reference to an acknowledged data transfer state.

Referring to FIG. 2A and FIG. 2B, FIG. 2A and FIG. 2B are a schematic flowchart of another order processing method according to an embodiment of the present disclosure. As shown in FIG. 2A and FIG. 2B, the method in this embodiment of the present disclosure may include the following step S201 to step S210.

S201. Obtain first order information and order sharing condition information, and generate an order sharing invitation message according to the first order information and the order sharing condition information, where the first order information includes a first data transfer volume, and the order sharing condition information includes a minimum data transfer volume required to meet an order sharing condition.

In this embodiment of the present disclosure, the first data transfer volume is an original price of an item selected by an terminal 1, and the minimum data transfer volume is a minimum amount required to meet the order sharing condition.

Specifically, when a user (an order sharing initiator) completes selection of a required item on an e-commerce website or in a mall, the terminal 1 generates the first order information according to information about the item selected by the user. The first order information includes information such as a name or a type, and a price (the first data transfer volume) that are of the item selected by the terminal 1. The order sharing condition is a preference condition provided by a merchant of the e-commerce web site or of the mall. In a specific implementation process, the order sharing condition information is directly sent to the terminal 1 by the e-commerce website, or is preference information that is provided by the mall, entered by the user, and received by the terminal 1. The order sharing invitation message generated by the terminal 1 with reference to the first order information and the order sharing condition information may specifically include: the order sharing condition information (the preference information), information about a remaining amount for meeting the order sharing condition (that is, a difference between the minimum data transfer volume and the first data transfer volume), a category of a subject matter, a home merchant, and the like.

S202. Obtain a terminal list, where the terminal list includes at least one contact identifier, and a terminal corresponding to each contact identifier is configured to receive the order sharing invitation message.

In an implementation manner, a manner for obtaining a terminal list includes: obtaining characteristic information corresponding to each contact identifier in a stored contact list and a category of a subject matter indicated by the order sharing condition information; and searching for a contact identifier to which characteristic information associated with the category of the subject matter belongs, and generating the terminal list according to the found contact identifier, where the characteristic information includes a search key field of the subject matter.

Specifically, after the characteristic information that corresponds to each contact identifier and that includes the search key field of the subject matter is obtained, the characteristic information is compared with the category of the subject matter indicated by the order sharing condition information, and if the two match, it indicates that a terminal corresponding to the contact identifier may have searched for or paid attention to a same or a similar subject matter. Therefore, the terminal corresponding to the contact identifier is added to the terminal list.

It should be noted that the foregoing stored contact list specifically includes: a contact list stored on an SNS platform. An SNS is a new network service based on a social network, and is used to implement social contact between individuals and an accessorial service. An implementation form of the SNS platform may be a social networking site or a social application, such as Kaixin, WeChat, or Tencent QQ.

Specifically, the terminal 1 obtains the contact list stored on the SNS platform and the characteristic information corresponding to each contact identifier, where the characteristic information may be the search key field corresponding to each contact identifier, such as a dynamic label or a personalized label. By matching the characteristic information with the category of the subject matter, a terminal corresponding to a contact identifier that may accept an order sharing invitation is obtained and added to the terminal list.

In another implementation manner, a manner for obtaining a terminal list includes: obtaining a contact identifier selected from a stored contact list, and generating the terminal list according to the selected contact identifier.

Specifically, the terminal 1 directly selects the contact identifier from the stored contact list, and adds a terminal corresponding to the contact identifier to the terminal list.

It should be noted that the foregoing stored contact list specifically includes: a contact list stored on a social networking service SNS platform. The terminal 1 receives a terminal corresponding to a contact identifier to generate the terminal list, where the contact identifier is directly selected by the user from the contact list stored on the SNS platform.

In still another implementation manner, a manner for obtaining a terminal list includes:

obtaining a contact identifier within a preset geographical range, and generating the terminal list according to the contact identifier.

Specifically, this implementation manner may be applied to a scenario in which the user is shopping in a mall: when the user selects a to-be-purchased item, and an order amount of the to-be-purchased item does not meet the order sharing condition, the terminal 1 may send, by obtaining the contact identifier within the preset geographical range, the order sharing invitation message to a terminal corresponding to the contact identifier. In an implementation manner, obtaining a contact identifier within a preset geographical range includes: searching, by using the SNS platform, for a user who is using this application as well at that time or several users closest to the user (for example, obtaining a user who is using a "shake" function at the same time by using the "shake" function of WeChat, or obtaining a user closest to the user by means of "shake"), or obtaining a surrounding user identifier by using a location technology such as an iBeacon location technology, marking the obtained user with a corresponding contact identifier one by one, and generating the terminal list according to the contact identifier.

S203. Send the order sharing invitation message to the terminal corresponding to each contact identifier.

Specifically, the terminal 1 may establish an order sharing progress group according to at least one contact identifier in the obtained terminal list, and send the order sharing invitation message to terminals corresponding to all contact identifiers in the order sharing progress group, where the order sharing progress group is preferably an SNS group.

S204. Determine whether a time waiting for receiving an answer message of a target terminal exceeds a preset time threshold; if yes, perform step S203 again; if the time waiting for receiving the answer message of the target terminal does not exceed the preset time threshold, perform step S205.

It should be noted that the target terminal refers to at least one terminal that accepts and answers an order sharing invitation after receiving the order sharing invitation message. At least one piece of second order information in at least one answer message generated and returned by the target terminal or at least one piece of second order information generated by the terminal 1 according to at least one answer message returned by the target terminal is combined with the first order information of the terminal 1 (that is, "order sharing"). Therefore, if a waiting time expires before the terminal 1 receives valid order information, the order sharing invitation message needs to be resent, so as to avoid an extremely long time for waiting an answer when message sending does not succeed. It may be understood that the second order information includes a second data transfer volume, the resent order sharing invitation message is a message obtained after the order sharing invitation message is updated in real time according to an acknowledged data transfer state, that is, a difference between the minimum data transfer volume and a sum of the second data transfer volume in the existing second order information and the first data transfer volume is written into a to-be-resent order sharing invitation message, and is sent to other terminals except the target terminal, so as to notify a current remaining data transfer volume (such as a remaining amount) for which further order sharing needs to be performed.

The acknowledged data transfer state is specifically presented as a state sent by the target terminal to the terminal 1 when a user to whom the target terminal belongs confirms that an amount of an item that needs to be purchased is successfully transferred to a public account, where the public account may be a third party account. Optionally, the acknowledged data transfer state may further include a face-to-face payment status, an online payment status, or the like, which is specifically determined by a payment manner selected by the user to whom the target terminal belongs, where an optional payment manner includes: QR code payment, sound wave payment, a face-to-face payment manner such as NFC payment or cash payment, and online payment.

S205. Receive the answer message returned by the target terminal according to the order sharing invitation message, and generate, according to the answer message, second order information including data transfer pre-authorization information.

S206. Send the second order information to the target terminal, so that the target terminal sets an acknowledged data transfer state for the second order information according to the data transfer pre-authorization information.

It should be noted that the answer message includes a name and a selected payment manner that are of an item selected by the target terminal. In an implementation manner, the terminal 1 extracts, according to the answer message, an item name included in the answer message, and invokes an e-commerce price query interface to obtain an item price, or uses a web crawler tool to search for a price of a specified item on a specified e-commerce website, and generates, according to an item price of the e-commerce website that provides the order sharing condition information, the second order information associated with the target terminal. It should be noted that a second data transfer volume is an amount determined according to the item price obtained by query. Optionally, when receiving the answer message returned by the target terminal, the terminal 1 may generate, according to the answer message, the second order information including the data transfer pre-authorization information. The terminal 1 may save the second order information, and send the second order information to the target terminal. The target terminal may set the acknowledged data transfer state (for example, the selected payment manner and whether payment is completed) for the second order information according to the data transfer pre-authorization information. The terminal 1 may obtain the acknowledged data transfer state, and update a pre-stored payment status in the second order information.

Certainly, before returning the answer message, the target terminal may voluntarily invoke the e-commerce price query interface to obtain the item price, or use the web crawler tool to search for the price of the specified item in the specified e-commerce website, and generate, according to the item price of the e-commerce website that provides the order sharing condition information, the second order information associated with the target terminal. In addition, the target terminal adds the acknowledged data transfer state to the second order information, and sends the acknowledged data transfer state together with the answer message to the terminal 1. The terminal 1 may save the second order information.

In an implementation manner, the answer message may further include a real-time geographical location or a navigation route of the target terminal, and the terminal 1 may find the target terminal according to the real-time geographical location, or determine, according to the real-time geographical location after order sharing succeeds, an optimal time and place for the target terminal to receive goods.

S207. Perform combination processing on the first order information and the second order information according to the acknowledged data transfer state returned by the target terminal, and generate settlement order information.

It should be noted that performing combination processing on the first order information and the second order information specifically refers to: adding the first data transfer volume to the second data transfer volume, so that a combined order meets the order sharing condition indicated by the order sharing condition information, that is, a sum of the first data transfer volume and the second data transfer volume is greater than or equal to the minimum data transfer volume. The settlement order information includes: a name and an original price (the first data transfer volume) that are of an item purchased by the terminal 1, a name and an original price (the second data transfer volume) that are of an item purchased by the target terminal, and a payment manner. The terminal 1 may perform the combination processing on the first order information and the second order information according to the acknowledged data transfer state returned by the target terminal, and generate the settlement order information.

S208. When a sum of the first data transfer volume and a second data transfer volume is greater than or equal to the minimum data transfer volume, send an order sharing success message to the terminal corresponding to each contact identifier, where the order sharing success message may include an original price, a discounted price, and the like that are of each item in the settlement order information; specifically, determine whether the sum of the first data transfer volume and the second data transfer volume is greater than or equal to the minimum data transfer volume, and if a determining result is no, it indicates that order sharing does not succeed, and a combination of the first order information and the second order information still cannot meet the order sharing condition.

If the settlement order information meets the order sharing condition, it indicates that the order sharing succeeds, and the order sharing success message is sent to the terminal corresponding to each contact identifier, so as to notify all terminals that the order sharing condition is satisfied (a coupon is used) and the order sharing ends. Preferably, the order sharing success message may be sent to the terminals corresponding to all the contact identifiers in the order sharing progress group, and messages sent by all the terminals are stopped being received, so as to avoid a message of accepting the order sharing sent by another terminal again.

S209. Perform settlement on the settlement order information according to the order sharing condition information.

Specifically, when the sum of the first data transfer volume and the second data transfer volume is greater than or equal to the minimum data transfer volume, the settlement is performed on the settlement order information according to the order sharing condition information, that is, when a sum of original prices of items respectively purchased by the terminal 1 and the target terminal meets an order preference condition indicated by the order sharing condition information, the settlement is performed on the settlement order information according to preference information (a discount rate or reduction and exemption preference) included in the order sharing condition information, where a settlement process may include but is not limited to a process in which the terminal 1 places an order on the e-commerce website or in the mall and pays according to the settlement order information.

S210. Send settlement status information in the settlement order information to the target terminal.

It should be noted that the settlement status information includes: names, original prices, discounted prices, payment manners, and payment statuses that are of the items respectively purchased by the terminal 1 and the target terminal, where the payment statuses are initialized to "unpaid". Preferably, the terminal 1 may send the settlement status information in the order sharing progress group, so as to prompt a user to whom a target terminal that does not pay belongs to pay for second order information of the user.

Optionally, by using the order sharing progress group, payment information generated according to the order sharing condition is sent to the target terminal that does not pay. The payment information includes: a payable amount of the target terminal, a goods receipt time, and a goods receipt place.

It should be noted that after receiving the payment information, the target terminal sends an acknowledged transfer message to the public account, so that the terminal 1 receives an amount transferred out from the public account. In an implementation manner, if the terminal 1 never receives the payable amount of the target terminal, the settlement status information may be periodically sent to the target terminal or the settlement status information may be periodically released in the order sharing progress group, so as to urge the target terminal that does not pay to complete a payment operation as soon as possible.

In this embodiment of the present disclosure, after an order sharing invitation message generated by using first order information and order sharing condition information is sent to one or more terminals, an answer message returned by a target terminal is received. After combination processing (that is, an order sharing operation) is performed on the first order information and second order information generated according to the answer message, settlement is performed on a blanket order according to an order sharing condition (which may be a preference condition) indicated by the order sharing condition information. A user who obtains the order sharing condition information does not need to manually contact another user who may join order sharing. A terminal may automatically process a combination of two or more orders, and perform settlement after the order combination succeeds, so that a usage rate of the order sharing condition and a success rate are increased, a sales volume of a merchant who releases the order sharing condition is increased, and payable amount reclamation is ensured with reference to setting of an acknowledged data transfer state and sending of settlement status information. A preset time threshold is set for receiving the answer message of the target terminal, so as to avoid an extremely long time for waiting an answer when message sending does not succeed, thereby improving order sharing efficiency.

With reference to FIG. 3 to FIG. 6, the following describes in detail terminals provided in embodiments of the present disclosure. It should be noted that the terminals shown in FIG. 3 to FIG. 6 are specifically the terminal is in the foregoing embodiments, and are configured to execute the methods in the embodiments shown in FIG. 1, FIG. 2A, and FIG. 2B. For ease of description, only a part related to the embodiments of the present disclosure is illustrated. For specific technical details that are not disclosed, refer to the embodiments of the present disclosure that are shown in FIG. 1, FIG. 2A, and FIG. 2B.

Figure 3:
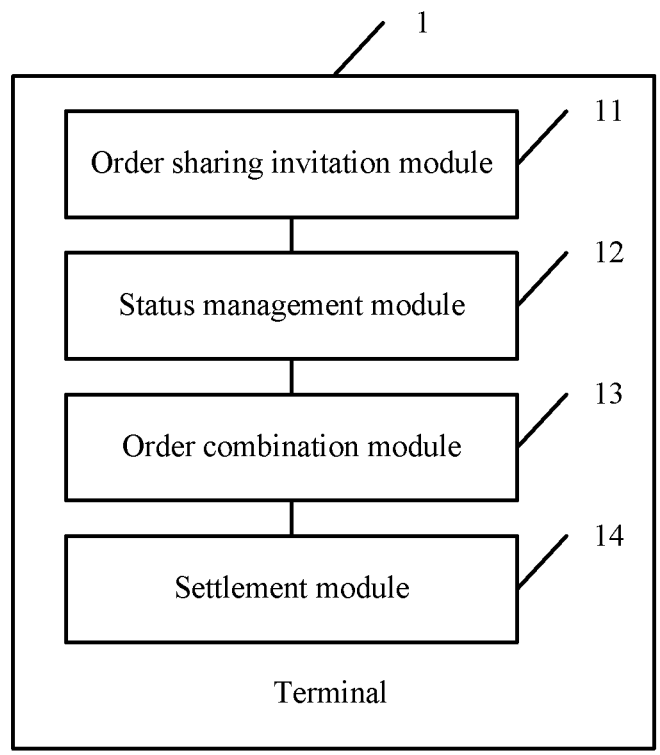
FIG. 3 is a schematic structural diagram of a terminal according to an embodiment of the present disclosure.

Referring to FIG. 3, FIG. 3 is a schematic structural diagram of a terminal according to an embodiment of the present disclosure. As shown in FIG. 3, the terminal 1 in this embodiment of the present disclosure may include: an order sharing invitation module 11, a status management module 12, an order combination module 13, and a settlement module 14.

The order sharing invitation module 11 is configured to obtain first order information and order sharing condition information, and generate an order sharing invitation message according to the first order information and the order sharing condition information.

In specific implementation, when a user (an order sharing initiator) completes selection of a required item on an e-commerce website or in a mall, the order sharing invitation module 11 generates the first order information according to information about the item selected by the user. The first order information includes information such as a type and a price that are of the selected item. An order sharing condition is a preference condition provided by a merchant of the e-commerce website or of the mall. In a specific implementation process, the order sharing condition information is directly sent to the terminal 1 by the e-commerce website, or is preference information that is provided by the mall, entered by the user, and received by the terminal 1. The order sharing invitation message generated by the order sharing invitation module 11 with reference to the first order information and the order sharing condition information may specifically include: the order sharing condition information (the preference information), information about a remaining amount for meeting the order sharing condition, a category of a subject matter, and a home merchant.

The status management module 12 is configured to receive an answer message returned by a target terminal according to the order sharing invitation message, and obtain, according to the answer message, second order information and an acknowledged data transfer state indicated by the second order information.

It should be noted that the target terminal refers to at least one terminal that returns the answer message after receiving the order sharing invitation message and accepting an order sharing invitation. At least one piece of second order information generated by the status management module 12 according to the answer message is combined with the first order information (that is, "order sharing").

In specific implementation, and in an implementation manner, the status management module 12 extracts, according to the answer message, an item name included in the answer message, and invokes an e-commerce price query interface to obtain an item price, or uses a web crawler tool to search for a price of a specified item on a specified e-commerce website, and generates, according to an item price of the e-commerce website that provides the order sharing condition information, the second order information associated with the target terminal. Optionally, when receiving the answer message returned by the target terminal, the status management module 12 may generate, according to the answer message, the second order information including data transfer pre-authorization information. The terminal 1 may save the second order information, and send the second order information to the target terminal. The target terminal may set the acknowledged data transfer state (for example, a selected payment manner and whether payment is completed) for the second order information according to the data transfer pre-authorization information. An optional payment manner includes: QR code payment, sound wave payment, a face-to-face payment manner such as NFC payment or cash payment, and online payment. The terminal 1 may obtain the acknowledged data transfer state, and update a pre-stored payment status in the second order information.

Certainly, before returning the answer message, the target terminal may voluntarily invoke the e-commerce price query interface to obtain the item price, or use the web crawler tool to search for the price of the specified item in the specified e-commerce website, and generate, according to the item price of the e-commerce website that provides the order sharing condition information, the second order information associated with the target terminal. In addition, the target terminal adds the acknowledged data transfer state to the second order information, and sends the acknowledged data transfer state together with the answer message to the terminal 1. The status management module 12 may save the second order information.

It may be understood that the acknowledged data transfer state is specifically presented as a state sent by the target terminal to the terminal 1 when a user to whom the target terminal belongs confirms that an amount of an item that needs to be purchased is successfully transferred to a public account, where the public account may be a third party account. Optionally, the acknowledged data transfer state may further include a face-to-face payment status, an online payment status, or the like, which is specifically determined by a payment manner selected by the user to whom the target terminal belongs.

Figure 4:
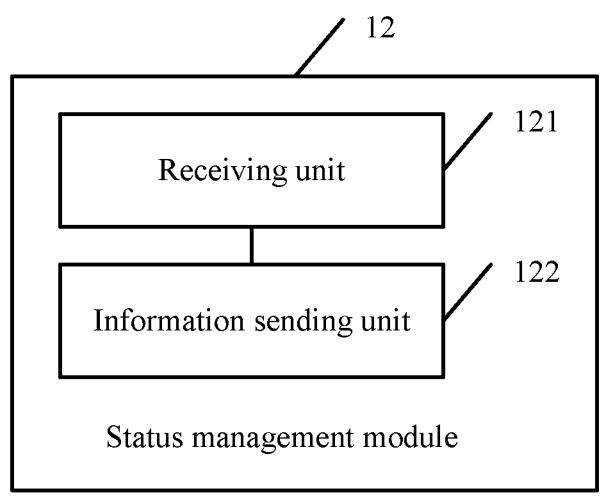
FIG. 4 is a schematic structural diagram of a status management module according to an embodiment of the present disclosure.

Specifically, further referring to FIG. 4, FIG. 4 is a schematic structural diagram of a status management module according to an embodiment of the present disclosure. As shown in FIG. 4, the status management module 12 may include:

a receiving unit 121, configured to receive the answer message returned by the target terminal according to the order sharing invitation message, and generate, according to the answer message, the second order information including data transfer pre-authorization information; and an information sending unit 122, configured to send the second order information to the target terminal, so that the target terminal sets the acknowledged data transfer state for the second order information according to the data transfer pre-authorization information.

In specific implementation, the answer message includes a name and a selected payment manner that are of an item selected by the target terminal. In an implementation manner, the receiving unit 121 extracts, according to the answer message, an item name included in the answer message, and invokes an e-commerce price query interface to obtain an item price, or uses a web crawler tool to search for a price of a specified item on a specified e-commerce website, and generates, according to an item price of the e-commerce website that provides the order sharing condition information, the second order information associated with the target terminal. It should be noted that a second data transfer volume is an amount determined according to the item price obtained by query. Optionally, when receiving the answer message returned by the target terminal, the receiving unit 121 may generate, according to the answer message, the second order information including the data transfer pre-authorization information. The terminal 1 may save the second order information. The information sending unit 122 sends the second order information to the target terminal. The target terminal may set the acknowledged data transfer state (for example, the selected payment manner) for the second order information according to the data transfer pre-authorization information. The terminal 1 may obtain the acknowledged data transfer state, and update a pre-stored payment status in the second order information.

Certainly, before returning the answer message, the target terminal may voluntarily invoke the e-commerce price query interface to obtain the item price, or use the web crawler tool to search for the price of the specified item in the specified e-commerce website, and generate, according to the item price of the e-commerce website that provides the order sharing condition information, the second order information associated with the target terminal. In addition, the target terminal adds the acknowledged data transfer state to the second order information, and sends the acknowledged data transfer state together with the answer message to the terminal 1. The terminal 1 may save the second order information.

In an implementation manner, the answer message may further include a real-time geographical location or a navigation route of the target terminal, and the terminal 1 may find the target terminal according to the real-time geographical location, or determine, according to the real-time geographical location after order sharing succeeds, an optimal time and place for the target terminal to receive goods.

The order combination module 13 is configured to perform combination processing on the first order information and the second order information according to the acknowledged data transfer state returned by the target terminal, and generate settlement order information.

In specific implementation, the settlement order information includes: a name and an original price (a first data transfer volume) that are of an item purchased by an terminal 1, a name and an original price (the second data transfer volume) that are of an item purchased by the target terminal, a payment manner, and the like. The order combination module 13 may perform the combination processing on the first order information and the second order information according to the acknowledged data transfer state returned by the target terminal, and generate the settlement order information.

The settlement module 14 is configured to perform settlement on the settlement order information according to the order sharing condition information when the settlement order information meets an order sharing condition indicated by the order sharing condition information.

In specific implementation, the first order information includes the first data transfer volume, the order sharing condition information includes a minimum data transfer volume required to meet the order sharing condition, and the second order information includes the second data transfer volume. When a sum of the first data transfer volume and the second data transfer volume that are included in the settlement order information (for example, a sum of original prices of items respectively purchased by the terminal 1 and the target terminal) reaches the minimum data transfer volume indicated by the order sharing condition information (for example, an order preference condition), the settlement module 14 performs the settlement on the settlement order information according to the preference information (a discount rate or reduction and exemption preference) included in the order sharing condition information, where a settlement process may include but is not limited to a process in which the terminal 1 places an order on the e-commerce website or in the mall and pays according to the settlement order information.

In this embodiment of the present disclosure, after an order sharing invitation message generated by using first order information and order sharing condition information is sent to one or more terminals, an answer message returned by a target terminal is received. After combination processing (that is, an order sharing operation) is performed on the first order information and second order information generated according to the answer message, settlement is performed on a blanket order according to an order sharing condition (which may be a preference condition) indicated by the order sharing condition information. A user who obtains the order sharing condition information does not need to manually contact another user who may join order sharing. A terminal may automatically process a combination of two or more orders, and perform settlement after the order combination succeeds, so that a usage rate of the order sharing condition and a success rate are increased, a sales volume of a merchant who releases the order sharing condition is increased, and payable amount reclamation is ensured with reference to an acknowledged data transfer state.

Figure 5:
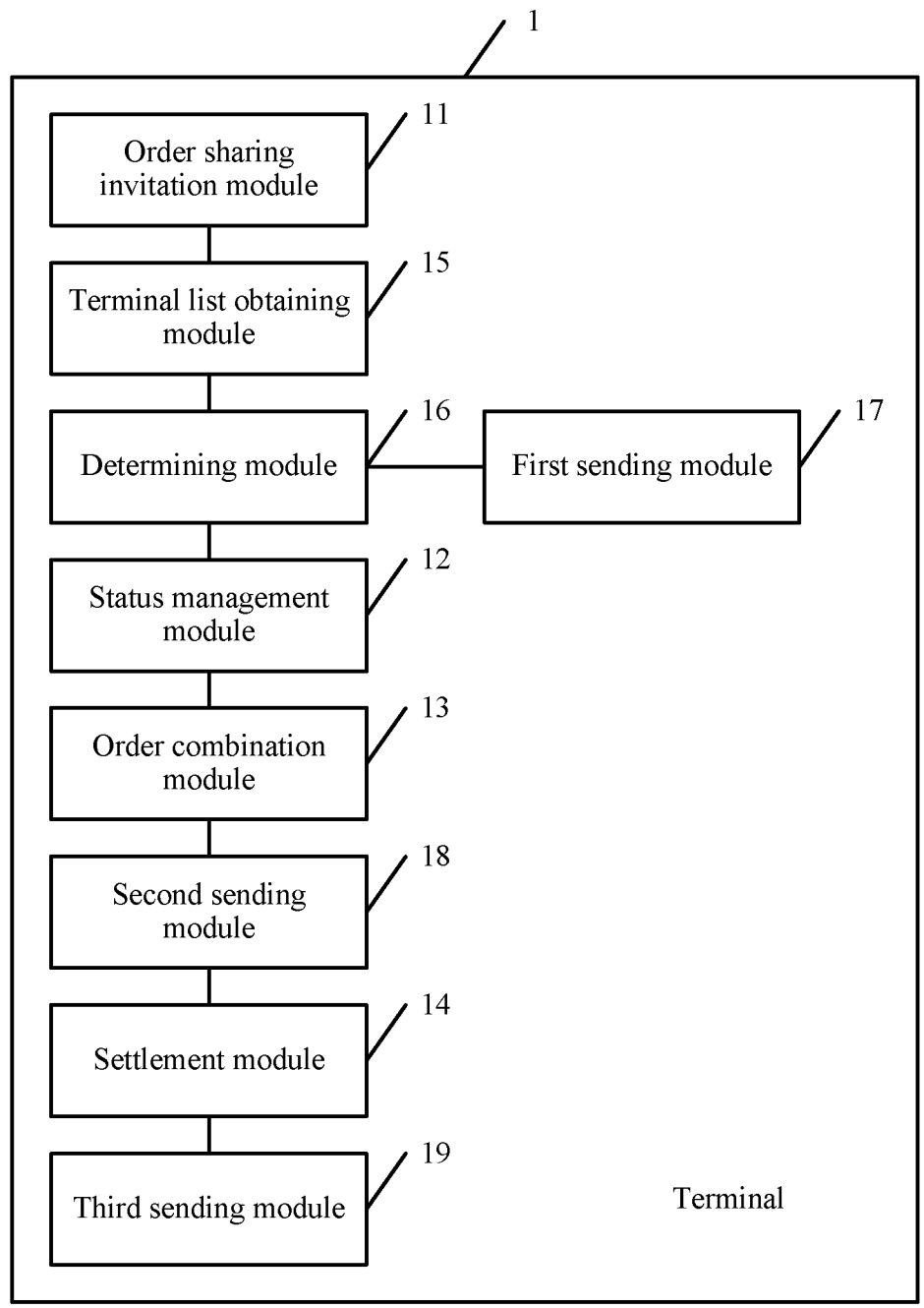
FIG. 5 is a schematic structural diagram of another terminal according to an embodiment of the present disclosure.

Referring to FIG. 5, FIG. 5 is a schematic structural diagram of another terminal according to an embodiment of the present disclosure. As shown in FIG. 5, the terminal 1 in this embodiment of the present disclosure may include: an order sharing invitation module 11, a status management module 12, an order combination module 13, a settlement module 14, a terminal list obtaining module 15, a determining module 16, a first sending module 17, a second sending module 18, and a third sending module 19.

The order sharing invitation module 11 is configured to obtain first order information and order sharing condition information, and generate an order sharing invitation message according to the first order information and the order sharing condition information.

The first order information includes a first data transfer volume, and the order sharing condition information includes a minimum data transfer volume required to meet an order sharing condition.

In this embodiment of the present disclosure, the first data transfer volume is an original price of an item selected by the terminal 1, and the minimum data transfer volume is a minimum amount required to meet the order sharing condition.

Specifically, when a user (an order sharing initiator) completes selection of a required item on an e-commerce website or in a mall, the order sharing invitation module 11 generates the first order information according to information about the item selected by the user. The first order information includes information such as a name or a type, and a price (the first data transfer volume) that are of the item selected by an terminal 1. The order sharing condition is a preference condition provided by a merchant of the e-commerce website or of the mall. In a specific implementation process, the order sharing condition information is directly sent to the terminal 1 by the e-commerce website, or is preference information that is provided by the mall, entered by the user, and received by the terminal 1. The order sharing invitation message generated by the order sharing invitation module 11 with reference to the first order information and the order sharing condition information may specifically include: the order sharing condition information (the preference information), information about a remaining amount for meeting the order sharing condition (that is, a difference between the minimum data transfer volume and the first data transfer volume), a category of a subject matter, and a home merchant.

The terminal list obtaining module 15 is configured to obtain a terminal list, where the terminal list includes at least one contact identifier, and a terminal corresponding to each contact identifier is configured to receive the order sharing invitation message.

In an implementation manner, a manner for obtaining a terminal list includes: obtaining, by the terminal list obtaining module 15, characteristic information corresponding to each contact identifier in a stored contact list and a category of a subject matter indicated by the order sharing condition information, and searching, by the terminal list obtaining module 15, for a contact identifier to which characteristic information associated with the category of the subject matter belongs, and generating the terminal list according to the found contact identifier, where the characteristic information includes a search key field of the subject matter.

In specific implementation, after obtaining the characteristic information that corresponds to each contact identifier and that includes the search key field of the subject matter, the terminal list obtaining module 15 compares the characteristic information with the category of the subject matter indicated by the order sharing condition information, and if the two match, it indicates that a terminal corresponding to the contact identifier may have searched for or paid attention to a same or a similar subject matter. Therefore, the terminal corresponding to the contact identifier is added to the terminal list.

It should be noted that the foregoing stored contact list specifically includes: a contact list stored on an SNS platform. An SNS is a new network service based on a social network, and is used to implement social contact between individuals and an accessorial service. An implementation form of the SNS platform may be a social networking site or a social application, such as Kaixin, WeChat, or Tencent QQ.

The terminal list obtaining module 15 obtains the contact list stored on the SNS platform and the characteristic information corresponding to each contact identifier, where the characteristic information may be the search key field corresponding to each contact identifier, such as a dynamic label or a personalized label. By matching the characteristic information with the category of the subject matter, the terminal list obtaining module 15 obtains a terminal corresponding to a contact identifier that may accept an order sharing invitation and adds the terminal to the terminal list.

In another implementation manner, a manner for obtaining a terminal list includes: obtaining, by the terminal list obtaining module 15, a contact identifier selected from a stored contact list, and generating the terminal list according to the selected contact identifier.

In specific implementation, the terminal list obtaining module 15 directly selects the contact identifier from the stored contact list, and adds a terminal corresponding to the contact identifier to the terminal list.

It should be noted that the foregoing stored contact list specifically includes: a contact list stored on a social networking service SNS platform. The terminal list obtaining module 15 receives a terminal corresponding to a contact identifier to generate the terminal list, where the contact identifier is directly selected by the user from the contact list stored on the SNS platform.

In still another implementation manner, a manner for obtaining a terminal list includes:

obtaining, by the terminal list obtaining module 15, a contact identifier within a preset geographical range, and generating the terminal list according to the contact identifier.

In specific implementation, this implementation manner may be applied to a scenario in which the user is shopping in a mall: when the user selects a to-be-purchased item, and an order amount of the to-be-purchased item does not meet the order sharing condition, the terminal list obtaining module 15 may send, by obtaining the contact identifier within the preset geographical range, the order sharing invitation message to a terminal corresponding to the contact identifier. In an implementation manner, obtaining a contact identifier within a preset geographical range includes: searching, by using the SNS platform, for a user who is using this application as well at that time or several users closest to the user (for example, obtaining a user who is using a "shake" function at the same time by using the "shake" function of WeChat, or obtaining a user closest to the user by means of "shake"), or obtaining a surrounding user identifier by using a location technology such as an iBeacon location technology, marking the obtained user with a corresponding contact identifier one by one, and generating the terminal list according to the contact identifier.

Figure 6:
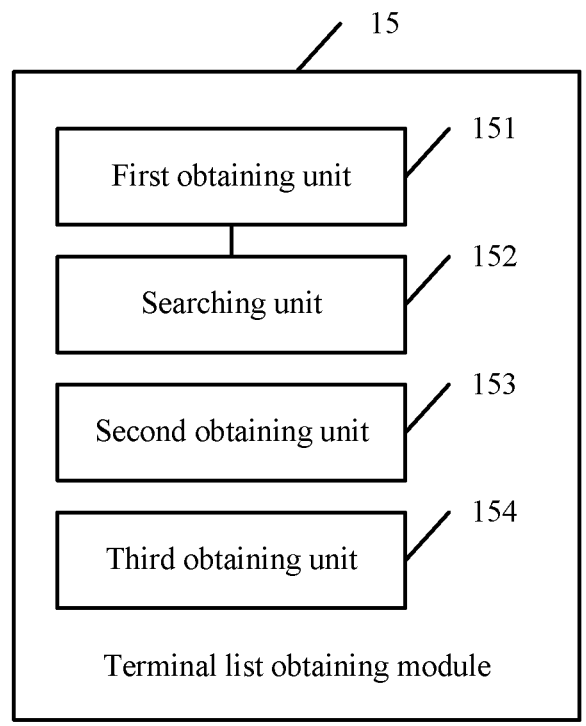
FIG. 6 is a schematic structural diagram of a terminal list obtaining module according to an embodiment of the present disclosure.

Specifically, further referring to FIG. 6, FIG. 6 is a schematic structural diagram of a terminal list obtaining module according to an embodiment of the present disclosure. As shown in FIG. 6, the terminal list obtaining module 15 may include:

a first obtaining unit 151, configured to obtain characteristic information corresponding to each contact identifier in a stored contact list and a category of a subject matter indicated by the order sharing condition information; and a searching unit 152, configured to search for a contact identifier to which characteristic information associated with the category of the subject matter belongs, and generate the terminal list according to the found contact identifier.

In specific implementation, a manner for obtaining a terminal list includes: obtaining, by the first obtaining unit 151, the characteristic information corresponding to each contact identifier in the stored contact list and the category of the subject matter indicated by the order sharing condition information; and searching, by the searching unit 152, for the contact identifier to which the characteristic information associated with the category of the subject matter belongs, and generating the terminal list according to the found contact identifier, where the characteristic information includes a search key field of the subject matter.

In specific implementation, after obtaining the characteristic information that corresponds to each contact identifier and that includes the search key field of the subject matter, the first obtaining unit 151 compares the characteristic information with the category of the subject matter indicated by the order sharing condition information, and if the two match, it indicates that a terminal corresponding to the contact identifier may have searched for or paid attention to a same or a similar subject matter. Therefore, the terminal corresponding to the contact identifier is added to the terminal list.

It should be noted that the foregoing stored contact list specifically includes: a contact list stored on an SNS platform. An SNS is a new network service based on a social network, and is used to implement social contact between individuals and an accessorial service. An implementation form of the SNS platform may be a social networking site or a social application, such as Kaixin, WeChat, or Tencent QQ.

The first obtaining unit 151 obtains the contact list stored on the SNS platform and the characteristic information corresponding to each contact identifier, where the characteristic information may be the search key field corresponding to each contact identifier, such as a dynamic label or a personalized label. By matching the characteristic information with the category of the subject matter, the searching unit 152 obtains a terminal corresponding to a contact identifier that may accept an order sharing invitation and adds the terminal to the terminal list.

Optionally, the terminal list obtaining module 15 may further include:

a second obtaining unit 153, configured to obtain a contact identifier selected from a stored contact list, and generate the terminal list according to the selected contact identifier.

In specific implementation, a manner for obtaining a terminal list includes: obtaining, by the second obtaining unit 153, the contact identifier selected from the stored contact list, and generating the terminal list according to the selected contact identifier.

The second obtaining unit 153 directly selects the contact identifier from the stored contact list, and adds a terminal corresponding to the contact identifier to the terminal list.

It should be noted that the foregoing stored contact list specifically includes: a contact list stored on a social networking service SNS platform. The second obtaining unit 153 receives a terminal corresponding to a contact identifier to generate the terminal list, where the contact identifier is directly selected by the user from the contact list stored on the SNS platform.

Optionally, the terminal list obtaining module 15 may further include:

a third obtaining unit 154, configured to obtain a contact identifier within a preset geographical range, and generate the terminal list according to the contact identifier.

In specific implementation, the third obtaining unit 154 obtains the contact identifier within the preset geographical range, and generates the terminal list according to the contact identifier.

This implementation manner may be applied to a scenario in which the user is shopping in a mall: when the user selects a to-be-purchased item, and an order amount of the to-be-purchased item does not meet the order sharing condition, the third obtaining unit 154 may send, by obtaining the contact identifier within the preset geographical range, the order sharing invitation message to a terminal corresponding to the contact identifier. In an implementation manner, obtaining a contact identifier within a preset geographical range includes: searching, by using the SNS platform, for a user who is using this application as well at that time or several users closest to the user (for example, obtaining a user who is using a "shake" function at the same time by using the "shake" function of WeChat, or obtaining a user closest to the user by means of "shake"), or obtaining a surrounding user identifier by using a location technology such as an iBeacon location technology, marking the obtained user with a corresponding contact identifier one by one, and generating the terminal list according to the contact identifier.

The terminal 1 may establish an order sharing progress group according to at least one contact identifier in the obtained terminal list, and send the order sharing invitation message to terminals corresponding to all contact identifiers in the order sharing progress group, where the order sharing progress group is preferably an SNS group.

The determining module 16 is configured to determine whether a time waiting for receiving an answer message of a target terminal exceeds a preset time threshold.

The first sending module 17 is configured to: when the determining module 16 determines that the time waiting for receiving the second order information of the target terminal exceeds the preset time threshold, resend the order sharing invitation message to the terminal corresponding to each contact identifier.

In specific implementation, the target terminal refers to at least one terminal that accepts and answers an order sharing invitation after receiving the order sharing invitation message. At least one piece of second order information in at least one answer message generated and returned by the target terminal or at least one piece of second order information generated by the status management module 12 according to at least one answer message returned by the target terminal is combined with the first order information (that is, "order sharing"). Therefore, before the terminal 1 receives valid order information, if the determining module 16 determines that a waiting time expires, the first sending module 17 should resend the order sharing invitation message, so as to avoid an extremely long time for waiting an answer when message sending does not succeed. It may be understood that the second order information includes a second data transfer volume, the resent order sharing invitation message is a message obtained after the order sharing invitation message is updated in real time according to an acknowledged data transfer state, that is, a difference between the minimum data transfer volume and a sum of the second data transfer volume in the existing second order information and the first data transfer volume is written into a to-be-resent order sharing invitation message, and is sent to other terminals except the target terminal, so as to notify a current remaining data transfer volume (such as a remaining amount) for which further order sharing needs to be performed.

The acknowledged data transfer state is specifically presented as a state sent by the target terminal to the terminal 1 when a user to whom the target terminal belongs confirms that an amount of an item that needs to be purchased is successfully transferred to a public account, where the public account may be a third party account. Optionally, the acknowledged data transfer state may further include a face-to-face payment status, an online payment status, or the like, which is specifically determined by a payment manner selected by the user to whom the target terminal belongs, where an optional payment manner includes: QR code payment, sound wave payment, a face-to-face payment manner such as NFC payment or cash payment, and online payment.

The status management module 12 is configured to receive an answer message returned by a target terminal according to the order sharing invitation message, and obtain, according to the answer message, second order information and an acknowledged data transfer state indicated by the second order information.

It should be noted that the target terminal refers to at least one terminal that returns the answer message after receiving the order sharing invitation message and accepting an order sharing invitation. At least one piece of second order information generated by the status management module 12 according to the answer message is combined with the first order information (that is, "order sharing").

In specific implementation, and in an implementation manner, the status management module 12 extracts, according to the answer message, an item name included in the answer message, and invokes an e-commerce price query interface to obtain an item price, or uses a web crawler tool to search for a price of a specified item on a specified e-commerce website, and generates, according to an item price of the e-commerce website that provides the order sharing condition information, the second order information associated with the target terminal. Optionally, when receiving the answer message returned by the target terminal, the status management module 12 may generate, according to the answer message, the second order information including data transfer pre-authorization information. The terminal 1 may save the second order information, and send the second order information to the target terminal. The target terminal may set the acknowledged data transfer state (for example, a selected payment manner and whether payment is completed) for the second order information according to the data transfer pre-authorization information. An optional payment manner includes: QR code payment, sound wave payment, a face-to-face payment manner such as NFC payment or cash payment, and online payment. The terminal 1 may obtain the acknowledged data transfer state, and update a pre-stored payment status in the second order information.

Certainly, before returning the answer message, the target terminal may voluntarily invoke the e-commerce price query interface to obtain the item price, or use the web crawler tool to search for the price of the specified item in the specified e-commerce website, and generate, according to the item price of the e-commerce website that provides the order sharing condition information, the second order information associated with the target terminal. In addition, the target terminal adds the acknowledged data transfer state to the second order information, and sends the acknowledged data transfer state together with the answer message to the terminal 1. The status management module 12 may save the second order information.

It may be understood that the acknowledged data transfer state is specifically presented as a state sent by the target terminal to the terminal 1 when a user to whom the target terminal belongs confirms that an amount of an item that needs to be purchased is successfully transferred to a public account, where the public account may be a third party account. Optionally, the acknowledged data transfer state may further include a face-to-face payment status, an online payment status, or the like, which is specifically determined by a payment manner selected by the user to whom the target terminal belongs.

Specifically, further referring to FIG. 4, FIG. 4 is a schematic structural diagram of a status management module according to an embodiment of the present disclosure. As shown in FIG. 4, the status management module 12 may include:

a receiving unit 121, configured to receive the answer message returned by the target terminal according to the order sharing invitation message, and generate, according to the answer message, the second order information including data transfer pre-authorization information; and an information sending unit 122, configured to send the second order information to the target terminal, so that the target terminal sets the acknowledged data transfer state for the second order information according to the data transfer pre-authorization information.

In specific implementation, the answer message includes a name and a selected payment manner that are of an item selected by the target terminal. In an implementation manner, the receiving unit 121 extracts, according to the answer message, an item name included in the answer message, and invokes an e-commerce price query interface to obtain an item price, or uses a web crawler tool to search for a price of a specified item on a specified e-commerce website, and generates, according to an item price of the e-commerce website that provides the order sharing condition information, the second order information associated with the target terminal. It should be noted that a second data transfer volume is an amount determined according to the item price obtained by query. Optionally, when receiving the answer message returned by the target terminal, the receiving unit 121 may generate, according to the answer message, the second order information including the data transfer pre-authorization information. The terminal 1 may save the second order information. The information sending unit 122 sends the second order information to the target terminal. The target terminal may set the acknowledged data transfer state (for example, the selected payment manner) for the second order information according to the data transfer pre-authorization information. The terminal 1 may obtain the acknowledged data transfer state, and update a pre-stored payment status in the second order information.

Certainly, before returning the answer message, the target terminal may voluntarily invoke the e-commerce price query interface to obtain the item price, or use the web crawler tool to search for the price of the specified item in the specified e-commerce website, and generate, according to the item price of the e-commerce website that provides the order sharing condition information, the second order information associated with the target terminal. In addition, the target terminal adds the acknowledged data transfer state to the second order information, and sends the acknowledged data transfer state together with the answer message to the terminal 1. The terminal 1 may save the second order information.

In an implementation manner, the answer message may further include a real-time geographical location or a navigation route of the target terminal, and the terminal 1 may find the target terminal according to the real-time geographical location, or determine, according to the real-time geographical location after order sharing succeeds, an optimal time and place for the target terminal to receive goods.

The order combination module 13 is configured to perform combination processing on the first order information and the second order information according to the acknowledged data transfer state returned by the target terminal, and generate settlement order information.

In specific implementation, performing combination processing on the first order information and the second order information specifically refers to: adding, by the order combination module 13, the first data transfer volume to the second data transfer volume, so that a combined order meets the order sharing condition indicated by the order sharing condition information, that is, a sum of the first data transfer volume and the second data transfer volume is greater than or equal to the minimum data transfer volume. The settlement order information includes: a name and an original price (the first data transfer volume) that are of an item purchased by the terminal 1, a name and an original price (the second data transfer volume) that are of an item purchased by the target terminal, and a payment manner. The order combination module 13 may perform the combination processing on the first order information and the second order information according to the acknowledged data transfer state returned by the target terminal, and generate the settlement order information.

The second sending module 18 is configured to: before the settlement module 14 performs the settlement on the settlement order information according to the order sharing condition information, send an order sharing success message to the terminal corresponding to each contact identifier.

In specific implementation, the terminal 1 determines whether the sum of the first data transfer volume and the second data transfer volume is greater than or equal to the minimum data transfer volume. If a determining result is no, it indicates that order sharing does not succeed, and a combination of the first order information and the second order information still cannot meet the order sharing condition.

If the settlement order information meets the order sharing condition, it indicates that the order sharing succeeds, and the second sending module 18 sends the order sharing success message to the terminal corresponding to each contact identifier, so as to notify all terminals that the order sharing condition is satisfied (a coupon is used) and the order sharing ends. Preferably, the second sending module 18 may send the order sharing success message to the terminals corresponding to all the contact identifiers in the order sharing progress group, and stop receiving messages sent by all the terminals, so as to avoid a message of accepting the order sharing sent by another terminal again.

The settlement module 14 is configured to perform settlement on the settlement order information according to the order sharing condition information when the settlement order information meets an order sharing condition indicated by the order sharing condition information.

In specific implementation, when the sum of the first data transfer volume and the second data transfer volume is greater than or equal to the minimum data transfer volume, the settlement module 14 performs the settlement on the settlement order information according to the order sharing condition information, that is, when a sum of original prices of items respectively purchased by the terminal 1 and the target terminal meets an order preference condition indicated by the order sharing condition information, the settlement module 14 performs the settlement on the settlement order information according to preference information (a discount rate or reduction and exemption preference) included in the order sharing condition information, where a settlement process may include but is not limited to a process in which the terminal 1 places an order on the e-commerce website or in the mall and pays according to the settlement order information.

The third sending module 19 is configured to send settlement status information in the settlement order information to the target terminal.

In specific implementation, the settlement status information includes: names, original prices, discounted prices, payment manners, and payment statuses that are of the items respectively purchased by the terminal 1 and the target terminal, where the payment statuses are initialized to "unpaid". Preferably, the third sending module 19 may send the settlement status information in the order sharing progress group, so as to prompt a user to whom a target terminal that does not pay belongs to pay for second order information of the user.

Optionally, by using the order sharing progress group, generated payment information is sent to the target terminal that does not pay. The payment information includes: a payable amount of the target terminal, a goods receipt time, and a goods receipt place.

It should be noted that after receiving the payment information, the target terminal sends an acknowledged transfer message to the public account, so that the terminal 1 receives an amount transferred out from the public account. In an implementation manner, if the terminal 1 never receives the payable amount of the target terminal, the settlement status information may be periodically sent to the target terminal or the settlement status information may be periodically released in the order sharing progress group, so as to urge the target terminal that does not pay to complete a payment operation as soon as possible.

In this embodiment of the present disclosure, after an order sharing invitation message generated by using first order information and order sharing condition information is sent to one or more terminals, an answer message returned by a target terminal is received. After combination processing (that is, an order sharing operation) is performed on the first order information and second order information generated according to the answer message, settlement is performed on a blanket order according to an order sharing condition (which may be a preference condition) indicated by the order sharing condition information. A user who obtains the order sharing condition information does not need to manually contact another user who may join order sharing. A terminal may automatically process a combination of two or more orders, and perform settlement after the order combination succeeds, so that a usage rate of the order sharing condition and a success rate are increased, a sales volume of a merchant who releases the order sharing condition is increased, and payable amount reclamation is ensured with reference to setting of an acknowledged data transfer state and sending of settlement status information. A preset time threshold is set for receiving the answer message of the target terminal, so as to avoid an extremely long time for waiting an answer when message sending does not succeed, thereby improving order sharing efficiency.

Figure 7:
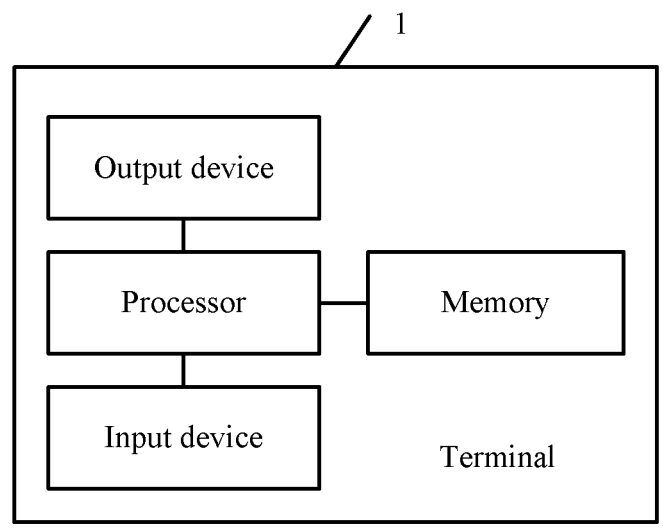
FIG. 7 is a schematic structural diagram of still another terminal according to an embodiment of the present disclosure.

Referring to FIG. 7, FIG. 7 is a schematic structural diagram of still another terminal according to an embodiment of the present disclosure. As shown in FIG. 7, the terminal 1 in this embodiment of the present disclosure may include: a processor, a memory, an input device, and an output device, where the memory stores a set of program code, and the processor invokes the program code in the memory to:

obtain first order information and order sharing condition information, and generate an order sharing invitation message according to the first order information and the order sharing condition information;

control the input device to receive an answer message returned by a target terminal according to the order sharing invitation message, and obtain, according to the answer message, second order information and an acknowledged data transfer state indicated by the second order information;

perform combination processing on the first order information and the second order information according to the acknowledged data transfer state returned by the target terminal, and generate settlement order information; and when the settlement order information meets an order sharing condition indicated by the order sharing condition information, control the output device to perform settlement on the settlement order information according to the order sharing condition information.

In a feasible implementation manner of this embodiment of the present disclosure, after being configured to obtain the first order information and the order sharing condition information, and generate the order sharing invitation message according to the first order information and the order sharing condition information, the processor is further configured to:

obtain a terminal list, where the terminal list includes at least one contact identifier, and a terminal corresponding to each contact identifier is configured to receive the order sharing invitation message.

In another feasible implementation manner of this embodiment of the present disclosure, when being configured to obtain the terminal list, the processor is specifically configured to:

obtain characteristic information corresponding to each contact identifier in a stored contact list and a category of a subject matter indicated by the order sharing condition information; and search for a contact identifier to which characteristic information associated with the category of the subject matter belongs, and generate the terminal list according to the found contact identifier, where the characteristic information includes a search key field of the subject matter.

In still another feasible implementation manner of this embodiment of the present disclosure, when being configured to obtain the terminal list, the processor is specifically configured to:

obtain a contact identifier selected from a stored contact list, and generate the terminal list according to the selected contact identifier.

In still another feasible implementation manner of this embodiment of the present disclosure, the stored contact list specifically includes: a contact list stored on an SNS platform.

In still another feasible implementation manner of this embodiment of the present disclosure, when being configured to obtain the terminal list, the processor is specifically configured to:

control the input device to obtain a contact identifier within a preset geographical range, and generate the terminal list according to the contact identifier.

Optionally, a manner for obtaining a terminal list includes: obtaining characteristic information corresponding to each contact identifier in a stored contact list and a category of a subject matter indicated by the order sharing condition information; and searching for a contact identifier to which characteristic information associated with the category of the subject matter belongs, and generating the terminal list according to the found contact identifier, where the characteristic information includes a search key field of the subject matter.

Specifically, after the characteristic information that corresponds to each contact identifier and that includes the search key field of the subject matter is obtained, the characteristic information is compared with the category of the subject matter indicated by the order sharing condition information, and if the two match, it indicates that a terminal corresponding to the contact identifier may have searched for or paid attention to a same or a similar subject matter. Therefore, the terminal corresponding to the contact identifier is added to the terminal list.

It should be noted that the foregoing stored contact list specifically includes: a contact list stored on an SNS platform. An SNS is a new network service based on a social network, and is used to implement social contact between individuals and an accessorial service. An implementation form of the SNS platform may be a social networking site or a social application, such as Kaixin, WeChat, or Tencent QQ.

Specifically, an terminal 1 obtains the contact list stored on the SNS platform and the characteristic information corresponding to each contact identifier, where the characteristic information may be the search key field corresponding to each contact identifier, such as a dynamic label or a personalized label. By matching the characteristic information with the category of the subject matter, a terminal corresponding to a contact identifier that may accept an order sharing invitation is obtained and added to the terminal list.

Optionally, a manner for obtaining a terminal list includes: obtaining a contact identifier selected from a stored contact list, and generating the terminal list according to the selected contact identifier.

Specifically, the terminal 1 directly selects the contact identifier from the stored contact list, and adds a terminal corresponding to the contact identifier to the terminal list.

It should be noted that the foregoing stored contact list specifically includes: a contact list stored on a social networking service SNS platform. The terminal 1 receives a terminal corresponding to a contact identifier to generate the terminal list, where the contact identifier is directly selected by a user from the contact list stored on the SNS platform.

Optionally, a manner for obtaining a terminal list includes:

obtaining a contact identifier within a preset geographical range, and generating the terminal list according to the contact identifier.

Specifically, this implementation manner may be applied to a scenario in which the user is shopping in a mall: when the user selects a to-be-purchased item, and an order amount of the to-be-purchased item does not meet the order sharing condition, the terminal 1 may send, by obtaining the contact identifier within the preset geographical range, the order sharing invitation message to a terminal corresponding to the contact identifier. In an implementation manner, obtaining a contact identifier within a preset geographical range includes: searching, by using the SNS platform, for a user who is using this application as well at that time or several users closest to the user (for example, obtaining a user who is using a "shake" function at the same time by using the "shake" function of WeChat, or obtaining a user closest to the user by means of "shake"), or obtaining a surrounding user identifier by using a location technology such as an iBeacon location technology, marking the obtained user with a corresponding contact identifier one by one, and generating the terminal list according to the contact identifier.

In still another feasible implementation manner of this embodiment of the present disclosure, before being configured to receive the answer message returned by the target terminal according to the order sharing invitation message, the processor is further configured to:

determine whether a time during which the input device waits to receive the answer message of the target terminal exceeds a preset time threshold; and if yes, control the output device to resend the order sharing invitation message to the terminal corresponding to each contact identifier, where the resent order sharing invitation message is a message obtained after the order sharing invitation message is updated in real time according to the acknowledged data transfer state.

In still another feasible implementation manner of this embodiment of the present disclosure, when being configured to receive the answer message returned by the target terminal according to the order sharing invitation message, and obtain, according to the answer message, the second order information and the acknowledged data transfer state indicated by the second order information, the processor is specifically configured to:

control the input device to receive the answer message returned by the target terminal according to the order sharing invitation message, and generate, according to the answer message, the second order information including data transfer pre-authorization information; and control the output device to send the second order information to the target terminal, so that the target terminal sets the acknowledged data transfer state for the second order information according to the data transfer pre-authorization information.

In still another feasible implementation manner of this embodiment of the present disclosure, before being configured to perform the settlement on the settlement order information according to the order sharing condition information, the processor is further configured to:

control the output device to send an order sharing success message to the terminal corresponding to each contact identifier.

In still another feasible implementation manner of this embodiment of the present disclosure, the first order information includes a first data transfer volume, the order sharing condition information includes a minimum data transfer volume required to meet the order sharing condition, and the second order information includes a second data transfer volume; and the processor is configured to perform the settlement on the settlement order information according to the order sharing condition information when the settlement order information meets an order sharing condition indicated by the order sharing condition information, where the processor is specifically configured to:

perform the settlement on the settlement order information according to the order sharing condition information when a sum of the first data transfer volume and the second data transfer volume is greater than or equal to the minimum data transfer volume.

In still another feasible implementation manner of this embodiment of the present disclosure, the processor is further configured to:

control the output device to send settlement status information in the settlement order information to the target terminal.

In this embodiment of the present disclosure, after an order sharing invitation message generated by using first order information and order sharing condition information is sent to one or more terminals, an answer message returned by a target terminal is received. After combination processing (that is, an order sharing operation) is performed on the first order information and second order information generated according to the answer message, settlement is performed on a blanket order according to an order sharing condition (which may be a preference condition) indicated by the order sharing condition information. A user who obtains the order sharing condition information does not need to manually contact another user who may join order sharing. A terminal may automatically process a combination of two or more orders, and perform settlement after the order combination succeeds, so that a usage rate of the order sharing condition and a success rate are increased, a sales volume of a merchant who releases the order sharing condition is increased, and payable amount reclamation is ensured with reference to setting of an acknowledged data transfer state and sending of settlement status information. A preset time threshold is set for receiving the answer message of the target terminal, so as to avoid an extremely long time for waiting an answer when message sending does not succeed, thereby improving order sharing efficiency.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A system comprising:
a first electronic device; and
a second electronic device;
wherein the first electronic device is configured to:
obtain first information of a first order and order sharing condition information, wherein the order sharing condition information is a preference condition;
obtain a contact identifier via a social network service (SNS) platform in response to a user input, wherein current location of the contact identifier is within a preset geographical range of current location of the first electronic device;
generate an order sharing invitation message;
send the order sharing invitation message to the second electronic device according to the contact identifier, wherein the contact identifier is corresponding to the second electronic device;
wherein the second electronic device is configured to send a response to the order sharing invitation message; and
wherein the first electronic device is further configured to:
obtain second information of a second order according to the response from the second electronic device;
pay for a third order, wherein third information of the third order comprises the first information and the second information, wherein a price of the third order is a first price minus a price corresponding to the preference condition, wherein the first price is a sum of a price of the first order and a price of the second order, wherein the third order meets an order sharing condition indicated by the order sharing condition information; and
send a payable amount to the second electronic device based on paying for the third order.

2. The system of claim 1, wherein the first electronic device is further configured to send a receipt time to the second electronic device.

3. The system of claim 1, wherein the first electronic device is further configured to pay for the third order according to discount information.

4. The system of claim 1, wherein the first information comprises a name of an item of the first order and a price of the item of the first order.

5. The system of claim 1, wherein the invitation message comprises merchant information.

6. The system of claim 1, wherein the third information comprises at least one of:
a name of an item of the first order;
a price of the item of the first order;
a name of an item of the second order; or
a price of the item of the second order.

7. The system of claim 1, wherein the first electronic device is further configured to obtain a payment manner of the third order.

8. The system of claim 1, wherein the first electronic device is further configured to obtain:
a navigation route of the second electronic device.

9. An apparatus, comprising:
at least one memory storing instructions; and
at least one processor configured to execute the instructions to cause the apparatus to perform steps comprising:
obtaining first information of a first order and order sharing condition information, wherein the order sharing condition information is a preference condition;
obtaining at least one contact identifier via a social network service (SNS) platform in response to a user input, wherein current location of the at least one contact identifier is within a preset geographical range of current location of the apparatus;

generating an order sharing invitation message;
sending the order sharing invitation message to at least one electronic device according to the at least one contact identifier, wherein the at least one contact identifier is corresponding to the at least one electronic device;
obtaining second information of a second order according to a response to the order sharing invitation message from the at least one electronic device; and
obtaining third information of a third order, wherein the third information comprises the first information and the second information, wherein a price of the third order is a first price minus a price corresponding to the preference condition, wherein the first price is a sum of a price of the first order and a price of the second order, wherein the third order meets an order sharing condition indicated by the order sharing condition information.

10. The apparatus of claim 9, wherein executing the instructions further causes the apparatus to pay for the third order.

11. The apparatus of claim 9, wherein the first information comprises a name of an item of the first order and a price of the item of the first order.

12. The apparatus of claim 9, wherein the third information comprises at least one of:
a name of an item of the first order;
a price of the item of the first order;
a name of an item of the second order; or
a price of the item of the second order.

13. The apparatus of claim 9, wherein executing the instructions further causes the apparatus to obtain a payment manner of the third order.

14. The apparatus of claim 9, wherein the price of the third order is a discount price of the sum of the price of the first order and the price of the second order.

15. The apparatus of claim 9, wherein the executing instructions further causes the apparatus to send a receipt time to the at least one electronic device.

16. The apparatus of claim 9, wherein the executing instructions further causes the apparatus to send a payable amount to the at least one electronic device based on the third order.

17. An apparatus, comprising:
at least one memory storing instructions; and
at least one processor configured to execute the instructions to cause the apparatus to perform steps comprising:
obtaining first information of a first order and order sharing condition information, wherein the order sharing condition information is a preference condition;
obtaining at least one contact identifier via a social network service (SNS) platform in response to a user input, wherein current location of the at least one contact identifier is within a preset geographical range of current location of the apparatus;
generating an order sharing invitation message;
sending the order sharing invitation message to at least one electronic device according to the at least one contact identifier, wherein the at least one contact identifier is corresponding to the at least one electronic device;
obtaining second information of a second order according to a response to the order sharing invitation message from the at least one electronic device;
paying for a third order, wherein third information of the third order comprises the first information and the second information, wherein a price of the third order is a first price minus a price corresponding to the preference condition, wherein the first price is a sum of a price of the first order and a price of the second order, wherein the third order meets an order sharing condition indicated by the order sharing condition information; and
sending a payable amount to the at least one electronic device based on paying for the third order.

18. The apparatus of claim 17, wherein the executing instructions further causes the apparatus to perform:
paying for the third order according to discount information.

19. The apparatus of claim 17, wherein the third information comprises at least one of:
a name of an item of the first order;
a price of the item of the first order;
a name of an item of the second order;
a price of the item of the second order; or
a payment manner of the third order.

20. The apparatus of claim 17, wherein the at least one electronic device comprises at least two electronic devices, wherein executing the instructions further causes the apparatus to perform:
sending a payable amount to each of the at least two electronic devices.

* * * * *